(12) United States Patent
Balasubramanian et al.

(10) Patent No.: US 12,649,451 B2
(45) Date of Patent: Jun. 9, 2026

(54) METHODS AND SYSTEMS FOR REDUNDANT SAFETY CONTROL IN BY-WIRE CONTROL SYSTEMS

(71) Applicant: GM GLOBAL TECHNOLOGY OPERATIONS LLC, Detroit, MI (US)

(72) Inventors: Sundaresan Balasubramanian, Lake Orion, MI (US); Sean Edward Zuzga, Farmington Hills, MI (US); Edward Thomas Heil, Howell, MI (US); Samuel Steele, Ypsilanti, MI (US); David Barnes, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 18/928,771

(22) Filed: Oct. 28, 2024

(65) Prior Publication Data

US 2026/0116364 A1    Apr. 30, 2026

(51) Int. Cl.
B60T 13/66       (2006.01)
B60T 7/04        (2006.01)

(52) U.S. Cl.
CPC ........... B60T 13/662 (2013.01); B60T 7/042 (2013.01); B60T 2270/82 (2013.01)

(58) Field of Classification Search
CPC ..... B60T 13/662; B60T 7/042; B60T 2270/82
USPC ......................................................... 701/70
See application file for complete search history.

(56) References Cited

U.S. PATENT DOCUMENTS 11,577,707 B2 * 2/2023 Mehdizade ............... B60T 8/34

FOREIGN PATENT DOCUMENTS

DE       102017217856 A1    4/2019

* cited by examiner

*Primary Examiner* — Hai H Huynh
(74) *Attorney, Agent, or Firm* — Ingrassia Fisher & Lorenz, LLP | IF&L

(57)        ABSTRACT

A redundant safety controller configured to monitor communications between at least one controller and a by-wire control system. The at least one controller has a first hardware architecture and is configured to manage operation of the by-wire control system. The redundant safety controller has a second hardware architecture. The first hardware architecture is different from the second hardware architecture. The at least one controller is configured to implement a first instruction set architecture. The redundant safety controller is configured to implement a second instruction set architecture. The first instruction set architecture is different from the second instruction set architecture. The redundant safety controller is configured to determine whether the at least one controller has failed and assume management of the operation of the by-wire control system based on the determination.

20 Claims, 5 Drawing Sheets

METHODS AND SYSTEMS FOR REDUNDANT SAFETY CONTROL IN BY-WIRE CONTROL SYSTEMS

INTRODUCTION

The technical field generally relates to vehicles, and more particularly relates to methods and systems for redundant safety control in by-wire control systems.

The absence of mechanical backup in by-wire controls systems in vehicles has led to a reliance on electronic and software control mechanisms to provide redundancies associated with operation of the by-wire control systems. Examples of by-wire control systems include, but are not limited to, braking by-wire systems and steering by-wire systems.

Accordingly, it is desirable to provide methods and systems for redundant safety control in by-wire control systems. Other desirable features and characteristics will become apparent from the subsequent detailed description and the appended claims, taken in conjunction with the accompanying drawings and the foregoing technical field and background.

SUMMARY

A redundant safety control system for a by-wire control system in a vehicle includes: a redundant safety controller configured to monitor communications between at least one controller and the by-wire control system, wherein: the at least one controller has a first hardware architecture and is configured to manage operation of the by-wire control system; the redundant safety controller has a second hardware architecture, wherein the first hardware architecture is different from the second hardware architecture; the at least one controller is configured to implement a first instruction set architecture; the redundant safety controller is configured to implement a second instruction set architecture, wherein the first instruction set architecture is different from the second instruction set architecture; determine whether the at least one controller has failed; and assume management of the operation of the by-wire control system based on the determination.

In at least one embodiment, the by-wire control system is a braking by-wire system including: a front right wheel brake actuator and a rear left wheel brake actuator configured to be powered by a first power grid of the vehicle; and a front left wheel brake actuator and a rear right wheel brake actuator configured to be powered by a second power grid of the vehicle; and the at least one controller is configured to be powered by the first and second power grid; and the redundant safety controller is configured to be powered by one of the first power grid and the second power grid.

In at least one embodiment, the at least one controller is communicatively coupled to the front right wheel brake actuator, the rear left wheel brake actuator, the front left wheel brake actuator, and the rear right wheel brake actuator via a first communication network; and the redundant safety controller is communicatively coupled to the front right wheel brake actuator, the rear left wheel brake actuator, the front left wheel brake actuator, and the rear right wheel brake actuator via a second communication network, wherein: the first communication network is a first type of communication network: the second communication network is a second type of communication network; and the first type of communication network is different from the second type of communication network.

In at least one embodiment, the first type of communication network is an Ethernet network and the second type of communication network is a controller area network (CAN).

In at least one embodiment, the braking by-wire system includes a brake pedal emulator and wherein: the brake pedal emulator is communicatively coupled to the at least one controller via a first communication channel and configured to transmit brake pedal emulator data via the first communication channel; and the brake pedal emulator is communicatively coupled to the redundant safety controller via a second communication channel and configured to transmit the brake pedal emulator data via the second communication channel.

In at least one embodiment, the at least one controller is communicatively coupled to the redundant safety controller via a third communication channel and configured to exchange data via the third communication channel.

In at least one embodiment, the by-wire control system is a steering by-wire system including: a first hand wheel actuator and a first road wheel actuator configured to be powered by a first power grid of the vehicle; and a second hand wheel actuator and a second road wheel actuator configured to be powered by a second power grid of the vehicle; and the at least one controller is configured to be powered by the first and second power grid; and the redundant safety controller is configured to be powered by one of the first power grid and the second power grid.

In at least one embodiment, the at least one controller is communicatively coupled to the first hand wheel actuator, the second hand wheel actuator, the first road wheel actuator, and the second road wheel actuator via a third communication network; and the redundant safety controller is communicatively coupled to the first hand wheel actuator, the second hand wheel actuator, the first road wheel actuator, and the second road wheel actuator via a fourth communication network, wherein: the third communication network is a third type of communication network: the fourth communication network is a fourth type of communication network; and the third type of communication network is different from the fourth type of communication network.

In at least one embodiment, the third type of communication network is an Ethernet network and the fourth type of communication network is a controller area network (CAN).

In at least one embodiment, the steering by-wire system includes: a first steering angle sensor (SAS) configured to be communicatively coupled to the first hand wheel actuator; a second SAS configured to be communicatively coupled to the second hand wheel actuator; and a tertiary SAS configured to be communicatively coupled to the first and second hand wheel actuators.

A vehicle including a redundant safety control system includes: a by-wire control system; at least one controller configured to manage operation of the by-wire control system; a redundant safety controller configured to: monitor communications between the at least one controller and the by-wire control system, wherein: the at least one controller has a first hardware architecture and is configured to manage operation of the by-wire control system; the redundant safety controller has a second hardware architecture, wherein the first hardware architecture is different from the second hardware architecture; the at least one controller is configured to implement a first instruction set architecture; the redundant safety controller is configured to implement a second instruction set architecture, wherein the first instruction set architecture is different from the second instruction set architecture; determine whether the at least one controller has failed; and assume the management of the operation of the by-wire control system based on the determination.

In at least one embodiment, the by-wire control system is a braking by-wire system includes: a front right wheel brake actuator and a front left wheel brake actuator configured to be powered by a first power grid of the vehicle; and a rear right wheel brake actuator and a rear left wheel brake actuator configured to be powered by a second power grid of the vehicle; and the at least one controller is configured to be powered by the first and second power grid; and the redundant safety controller is configured to be powered by one of the first power grid and the second power grid.

In at least one embodiment, the at least one controller is communicatively coupled to the front right wheel brake actuator, the rear left wheel brake actuator, the front left wheel brake actuator, and the rear right wheel brake actuator via a first communication network; and the redundant safety controller is communicatively coupled to the front right wheel brake actuator, the rear left wheel brake actuator, the front left wheel brake actuator, and the rear right wheel brake actuator via a second communication network, wherein: the first communication network is a first type of communication network: the second communication network is a second type of communication network; and the first type of communication network is different from the second type of communication network.

In at least one embodiment, the first type of communication network is an Ethernet network and the second type of communication network is a CAN.

In at least one embodiment, the braking by-wire system includes a brake pedal emulator and wherein: the brake pedal emulator is communicatively coupled to the at least one controller via a first communication channel and configured to transmit brake pedal emulator data via the first communication channel; and the brake pedal emulator is communicatively coupled to the redundant safety controller via a second communication channel and configured to transmit the brake pedal emulator data via the second communication channel.

In at least one embodiment, the at least one controller is communicatively coupled to the redundant safety controller via a third communication channel and configured to exchange data via the third communication channel.

In at least one embodiment, the by-wire control system is a steering by-wire system includes: a first hand wheel actuator and a first road wheel actuator configured to be powered by a first power grid of the vehicle; and a second hand wheel actuator and a second road wheel actuator configured to be powered by a second power grid of the vehicle; and the at least one controller is configured to be powered by the first and second power grid; and the redundant safety controller is configured to be powered by one of the first power grid and the second power grid.

In at least one embodiment, the at least one controller is communicatively coupled to the first hand wheel actuator, the second hand wheel actuator, the first road wheel actuator, and the second road wheel actuator via a third communication network; and the redundant safety controller is communicatively coupled to the first hand wheel actuator, the second hand wheel actuator, the first road wheel actuator, and the second road wheel actuator via a fourth communication network, wherein: the third communication network is a third type of communication network: the fourth communication network is a fourth type of communication network; and the third type of communication network is different from the fourth type of communication network.

In at least one embodiment, the steering by-wire system includes: a first steering angle sensor (SAS) configured to be communicatively coupled to the first hand wheel actuator; a second SAS configured to be communicatively coupled to the second hand wheel actuator; and a tertiary SAS configured to be communicatively coupled to the first and second hand wheel actuators.

A method for implementing redundant safety control in a vehicle includes monitoring, by a redundant safety controller, communications between at least one controller and a by-wire control system, wherein: the at least one controller has a first hardware architecture and is configured to manage operation of the by-wire control system; the redundant safety controller has a second hardware architecture, wherein the first hardware architecture is different from the second hardware architecture; the at least one controller is configured to implement a first instruction set architecture; the redundant safety controller is configured to implement a second instruction set architecture, wherein the first instruction set architecture is different from the second instruction set architecture; determining, by the redundant safety controller, whether the at least one controller has failed; and assuming management of the operation of the by-wire control system based on the determination.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
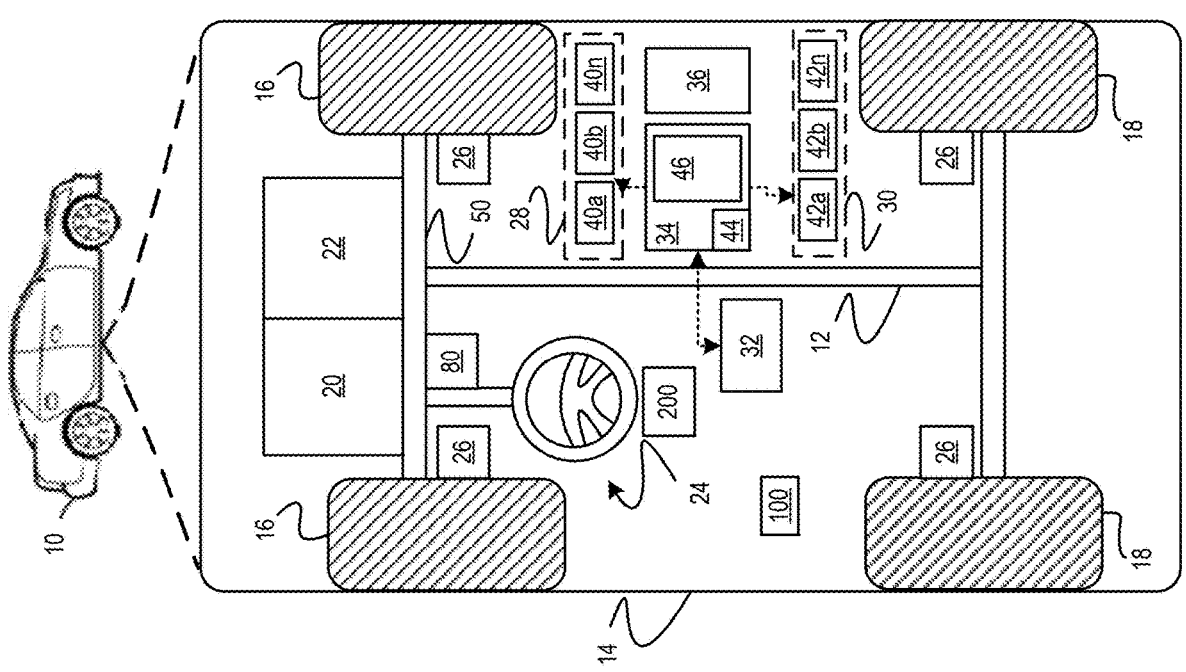
FIG. 1 is a functional block diagram of a vehicle including a redundant safety control system in accordance with at least one embodiment.

Referring to FIG. 1, a functional block diagram of a vehicle 10 including a redundant safety control system 100 in accordance with at least one embodiment. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In at least one embodiment, the vehicle 10 is a non-autonomous vehicle. In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16, 18. The braking system 26 may, in various embodiments, include friction brakes, brake by wire, a regenerative braking system such as an electric machine, and/or other appropriate braking systems. In at least one embodiment, the braking system 26 includes a braking by-wire system that includes actuators associated with each of the vehicle wheels 16, 18.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). In at least one embodiment, the steering system 24 includes a steer by wire system that includes actuators associated with each of the front wheels 16.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, a steering wheel sensor, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16, 18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate. In at least one embodiment, the vehicle dynamic sensors provide vehicle movement data.

The actuator system 30 includes one or more actuator devices 42a-42n that control one or more vehicle features such as, but not limited to, one or more vehicle wheels 16,18 the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered). In at least one embodiment, the actuator devices 42a-42n include a front right wheel brake actuator, a front left wheel brake actuator, a rear right wheel brake actuator, a rear left wheel brake actuator. In at least one embodiment, the actuator devices 42a-42n include a first hand wheel actuator, a second hand wheel actuator, a first road wheel actuator, and a second toad wheel actuator.

The communication system 36 is configured to wirelessly communicate information to and from other entities 48, such as but not limited to, other vehicles ("V2V" communication)

infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
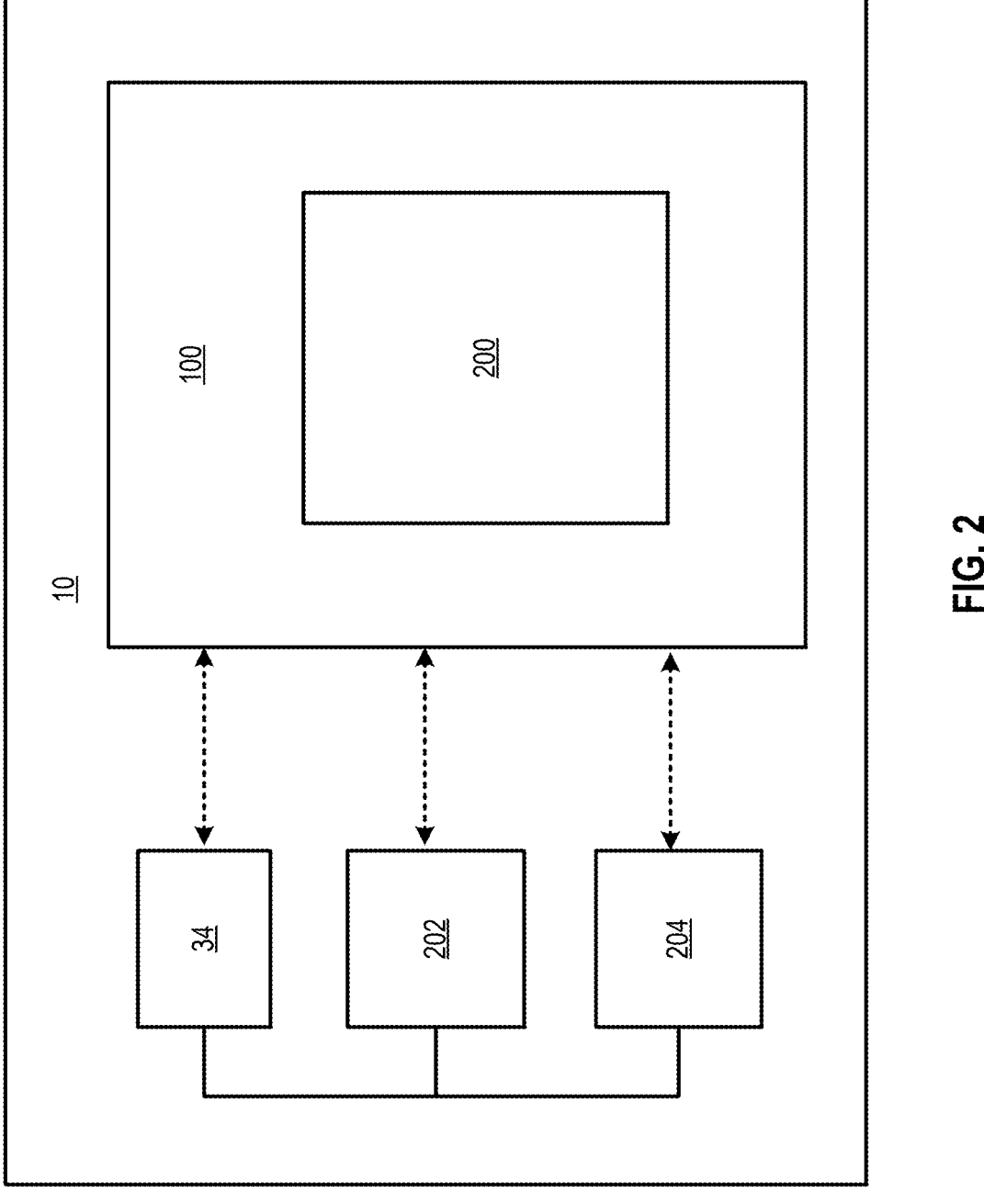
FIG. 2 is a functional block diagram of a redundant safety control system in accordance with at least one embodiment.

Referring to FIG. 2, a vehicle 10 including a redundant safety control system 100 in accordance with at least one embodiment is shown. The redundant safety control system 100 includes a redundant safety controller 200. The redundant safety controller 200 is configured to be communicatively coupled to at least one controller 34. In at least one embodiment, the controller(s) 34 and the redundant safety controller 200 are configured to exchange data a using control area network (CAN) based protocol. In at least one embodiment, the controller(s) 34 and the redundant safety controller 200 are configured to exchange data a using a single edge nibble transmission (SENT) based protocol. In at least one embodiment, the controller(s) 34 and the redundant safety controller 200 are configured to exchange data using an Ethernet based protocol.

In at least one embodiment, the controller(s) 34 and the redundant safety controller 200 are configured to be communicatively coupled to a braking by-wire system 202. The controller(s) 34 is configured to manage operation of the braking by-wire system 202. The redundant safety controller 200 is configured to passively monitor communications between the controller(s) 34 and the braking by-wire system 202. If the redundant safety controller 200 determines that the controller(s) 34 has failed, the redundant safety controller 200 assumes management of the operation of the braking by-wire system 202 and implements the management of the operation of the braking by-wire system 202 based at least in part on the monitored communications between the controller(s) 24 and the braking by-wire system 202.

In at least one embodiment, redundant safety controller 200 determines that the controller(s) 34 has failed when the controller(s) 34 goes silent. In at least one embodiment, redundant safety controller 200 determines that the controller(s) 34 has failed when the controller(s) 34 transmits a failure notification to the redundant safety controller 200. In at least one embodiment, the redundant safety controller 200 is configured to immobilize the vehicle 10 via the braking by-wire system 202, independently determine vehicle standstill, and request electromechanical brake park mechanisms upon determining that the controller(s) 34 has failed. In at least one embodiment, the redundant safety controller 200 is configured to implement reduced feature function of the braking by-wire system 202 upon assumption of control of operational management of the braking by-wire system 202.

In at least one embodiment, the controller(s) 34 and the redundant safety controller 200 are configured to be communicatively coupled to a steering by-wire system 204. The controller(s) 34 is configured to manage operation of the steering by-wire system 204. The redundant safety controller 200 is configured to passively monitor communications between the controller(s) 34 and the steering by-wire system 204. If the redundant safety controller 200 determines that the controller(s) 34 has failed, the redundant safety controller 200 assumes management of the operation of the steering by-wire system 204 and implements the management of the operation of the steering by-wire system 204 based at least in part on the monitored communications between the controller(s) 24 and the steering by-wire system 204.

In at least one embodiment, redundant safety controller 200 determines that the controller(s) 34 has failed when the controller(s) 34 goes silent. In at least one embodiment, redundant safety controller 200 determines that the controller(s) 34 has failed when the controller(s) 34 transmits a failure notification to the redundant safety controller 200. In at least one embodiment, the redundant safety controller 200 is configured to immobilize the vehicle 10 via the braking by-wire system 202, independently determine vehicle standstill, and request electromechanical brake park mechanisms upon determining that the controller(s) 34 has failed. In at least one embodiment, the redundant safety controller 200 is configured to implement reduced feature function of the steering by-wire system 204 upon assumption of control of operational management of the steering by-wire system 204.

In at least one embodiment, the controller(s) 34 and the redundant safety controller 200 are configured to be communicatively coupled to a braking by-wire system 202 and to the steering by-wire system 204. The controller(s) 34 is configured to manage operation of the braking by-wire system 202 and the steering by-wire system 204. The redundant safety controller 200 is configured to passively monitor communications between the controller(s) 34 and the braking by-wire system 202 and between the controller(s) 34 and the steering by-wire system 204. If the redundant safety controller 200 determines that the controller(s) 34 has failed, the redundant safety controller 200 assumes management of the operation of the braking by-wire system 202 and the steering by-wire system 204 and implements the management of the operation of the braking by-wire system 202 and the steering by-wire system 204 based at least in part on the monitored communications between the controller(s) 24 and the braking by-wire system 202 and the controller(s) 34 and the steering by-wire system 204.

In at least one embodiment, redundant safety controller 200 determines that the controller(s) 34 has failed when the controller(s) 34 go silent. In at least one embodiment, redundant safety controller 200 determines that the controller(s) 34 has failed when the controller(s) 34 transmits a failure notification to the redundant safety controller 200. In at least one embodiment, the redundant safety controller 200 is configured to immobilize the vehicle 10 via the braking by-wire system 202, independently determine vehicle standstill, and request electromechanical brake park mechanisms upon determining that the controller(s) 34 has failed. In at least one embodiment, the redundant safety controller 200 is configured to implement reduced feature function of the braking by-wire system 202 and the steering by-wire system 204 upon assumption of control of operational management of the braking by-wire system 202 and the steer by-wire system.

The controller(s) 34 has a first hardware architecture and is configured to implement a first instruction set architecture. The redundant safety controller 200 has a second hardware architecture and is configured to implement a second instruction set architecture. The first hardware architecture is different from the second hardware architecture. The first instruction set is different from the second instruction set architecture. The controller(s) 34 is configured to be powered by a first power grid and a second power grid in the vehicle 10. The redundant safety controller 200 is configured to be powered by one of the first power grid and the second power grid. The second power grid is independent of the first power grid. The redundant safety control system 100 may include additional components that facilitate operation of the redundant safety control system 100.

Figure 3:
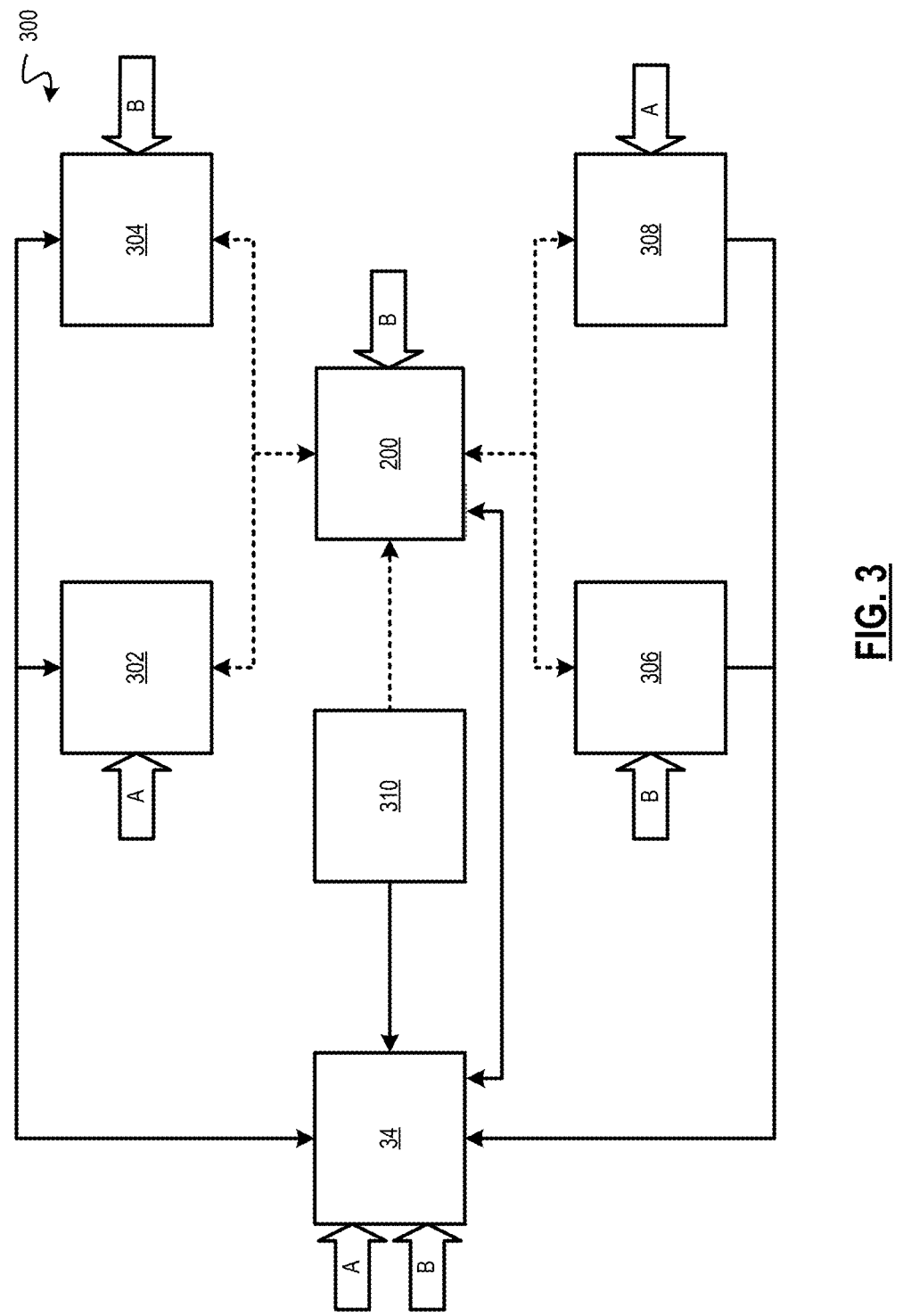
FIG. 3 is a functional block diagram of a system including a redundant safety controller communicatively coupled to a braking by-wire system in accordance with at least one embodiment.

Referring to FIG. 3, a functional block diagram of a system 300 including a redundant safety controller 200 communicatively coupled to a braking by-wire system 202 in accordance with at least one embodiment is shown. The braking by-wire system 202 includes a front right wheel brake actuator 302, a front left wheel brake actuator 304, a rear right wheel brake actuator 306, a rear left wheel brake actuator 308, and a brake pedal emulator 310. In at least one embodiment, one or more of the front right wheel brake actuator 302, the front left wheel brake actuator 304, the rear right wheel brake actuator 306, and the rear left wheel brake actuator 308 are electro-hydraulic actuators. In at least one embodiment, one or more of the front right wheel brake actuator 302, the front left wheel brake actuator 304, the rear right wheel brake actuator 306, and the rear left wheel brake actuator 308 are electromechanical actuators.

A controller(s) 34 is communicatively coupled to the front right wheel brake actuator 302, the front left wheel brake actuator 304, the rear right wheel brake actuator 306, the rear left wheel brake actuator 308, and the brake pedal emulator 310 via a first communication network. The first communication network, represented by the solid lines, is a first type of communication network. The redundant safety controller 200 is communicatively coupled to the front right wheel brake actuator 302, the front left wheel brake actuator 304, the rear right wheel brake actuator 306, the rear left wheel brake actuator 308, and the brake pedal emulator 310 via a second communication network. The second communication network, represented by the dotted lines, is a second type of communication network. The first type of communication network is different from the second type of communication network. In at least one embodiment, first type of communication network is an Ethernet network. In at least one embodiment, second type of communication network is a controller area network (CAN).

The vehicle 10 includes a first power grid A and a second power grid B. The first power grid A is independent of the second power grid B. In at least one embodiment, the front right wheel brake actuator 302 and the rear left wheel brake actuator 308 are configured to be powered by the first power grid A and the front left wheel brake actuator 304 and the rear right wheel brake actuator 306 are configured to be powered by the second power grid B. In at least one embodiment, the front left wheel brake actuator 304 and the rear right wheel brake actuator 306 are configured to be powered by the first power grid A and the front right wheel brake actuator 302 and the rear left wheel brake actuator 308 are configured to be powered by the second grid B.

In at least one embodiment, the rear right wheel brake actuator 306 and the rear left wheel brake actuator 308 and are configured to be powered by the first power grid A and the front right wheel brake actuator 302 and the front left wheel brake actuator 304 are configured to be powered by the second power grid B. In at least one embodiment, the front right wheel brake actuator 302 and the front left wheel brake actuator 304 are configured to be powered by the first power grid A and the rear right wheel brake actuator 306 and the rear left wheel brake actuator 308 are configured to be powered by the second power grid B.

In at least one embodiment, the controller(s) 34 is configured to be powered by the first power grid A and the second power grid B. The redundant safety controller 200 is configured to be powered by one of the first power grid A and the second power grid B. In at least one embodiment, the redundant safety controller 200 is configured to be powered by the second power grid B.

The brake pedal emulator 310 includes a plurality of brake pedal sensors. Each of the brake pedal sensors is configured to generate brake pedal emulator data. In at least one embodiment, each brake pedal sensor is individually communicatively coupled to the controller(s) 34 via a communication channel. The controller(s) 34 is configured to receive the brake pedal emulator data from each of the brake pedal sensors via the associated communication channel. In at least one embodiment, the brake pedal emulator 310 includes six brake pedal sensors. In at least one embodiment, the brake pedal emulator 310 is configured to transmit the brake pedal emulator data to the controller(s) 34 using a serialized data protocol. In at least one embodiment, the brake pedal emulator 310 is configured to transmit the brake pedal emulator data to the controller(s) 34 using a single edge nibble transmission (SENT) protocol.

In at least one embodiment, the redundant safety controller 200 is configured to receive the brake pedal emulator data from each of the plurality brake pedal sensors via an associated communication channel. In at least one embodiment, the brake pedal emulator 310 includes six brake pedal sensors. In at least one embodiment, the brake pedal emulator 310 is configured transmit the brake pedal emulator data associated with a subset of the six brake pedal sensors to the redundant safety controller 200. In at least one embodiment, the brake pedal emulator 310 is configured to transmit the brake pedal emulator data associated with at least one of the plurality of brake pedal sensors to the redundant safety controller 200 using a SENT protocol. In at least one embodiment, the redundant safety controller 200 operates as a message gateway to allow the controller(s) 34 to receive brake pedal emulator data from all six brake pedal sensors, even though two of the brake pedal sensors are wired to the redundant safety controller 200 directly and gatewayed over the Ethernet back to the controller(s) 34.

The controller(s) 34 is configured to manage the operation of the braking by-wire system 202. The redundant safety controller 200 is configured to passively monitor communications between the controller(s) 34 and the braking by-wire system 202. If the redundant safety controller 200 determines that the controller(s) 34 has failed, the redundant safety controller 200 assumes management of the operation of the braking by-wire system 202 and implements the management of the operation of the braking by-wire system 202 based at least in part on the monitored communications between the controller(s) 24 and the braking by-wire system 202. Upon the assumption of the management of the operation of the braking by-wire system 202, the redundant safety controller 200 receives brake pedal emulator data from the brake pedal emulator 310 and issues commands to the front right wheel brake actuator 302, the front left wheel brake actuator 304, the rear right wheel brake actuator 306, and the rear left wheel brake actuator 308 via the first communication network to safely bring the vehicle 10 to a standstill based in part on the received brake pedal emulator data.

In at least one embodiment, redundant safety controller 200 determines that the controller(s) 34 has failed when the controller(s) 34 go silent. In at least one embodiment, redundant safety controller 200 determines that the controller(s) 34 has failed when the controller(s) 34 transmits a failure notification to the redundant safety controller 200. In at least one embodiment, the redundant safety controller 200 is configured to immobilize the vehicle 10 via the braking by-wire system 202, independently determine vehicle standstill, and request electromechanical brake park mechanisms upon determining that the controller(s) 34 has failed. In at least one embodiment, the redundant safety controller 200 is configured to implement reduced feature function of the braking by-wire system 202 upon assumption of control of operational management of the braking by-wire system 202.

Redundancy in the braking function of the braking by-wire system 202 in the vehicle 10 enables the vehicle 10 to maintain functionality in the event of a single failure in the system 300. In the absence of redundancy, a single failure in the system 300 may lead to vehicle immobilization and additional failures may result in a total braking system failure in the vehicle 10. The use of a redundant safety control system 100 enables a mode of braking in the event of a dual-point failure in the system 300. The use of a redundant safety control system 100 prevents loss of vehicle deceleration and allows limited vehicle operation in the presence of single failures in the system 300.

Given the absence of mechanical backup braking in the braking by-wire system 202, reliance is shifted entirely to electronic and software/control mechanisms for providing redundant braking. The use of a redundant safety control system 100 may mitigate risk by incorporating orthogonality across the software, the hardware, and the electrical architecture communication in the system 300. Orthogonality in this context ensures that diversity in system components and operational logic minimizes the probability of a single failure affecting multiple system design elements. This strategic diversity enables maintaining braking functionality and system integrity under failure conditions.

The architecture disclosed in system 300 enables a redundant braking method to achieve complete functional independence from a main braking method via diversity of hardware, software and communication between the main and redundant brake control elements. The functional independence of the redundant braking method implemented through the use of the redundant safety control system 100 applies to compute software, hardware (micro, memory, etc.) and communication elements. Failures of one or more of these elements include immunity to external factors that could potentially cause a common cause failure of main and redundant braking functions. The braking by-wire system 202 is able to gain resistance to all single point failures that could induce malfunctioning behavior where both the main and redundant braking cannot provide functionality. This includes protection against cascading failures, common cause failures, and common mode failures.

Figure 4:
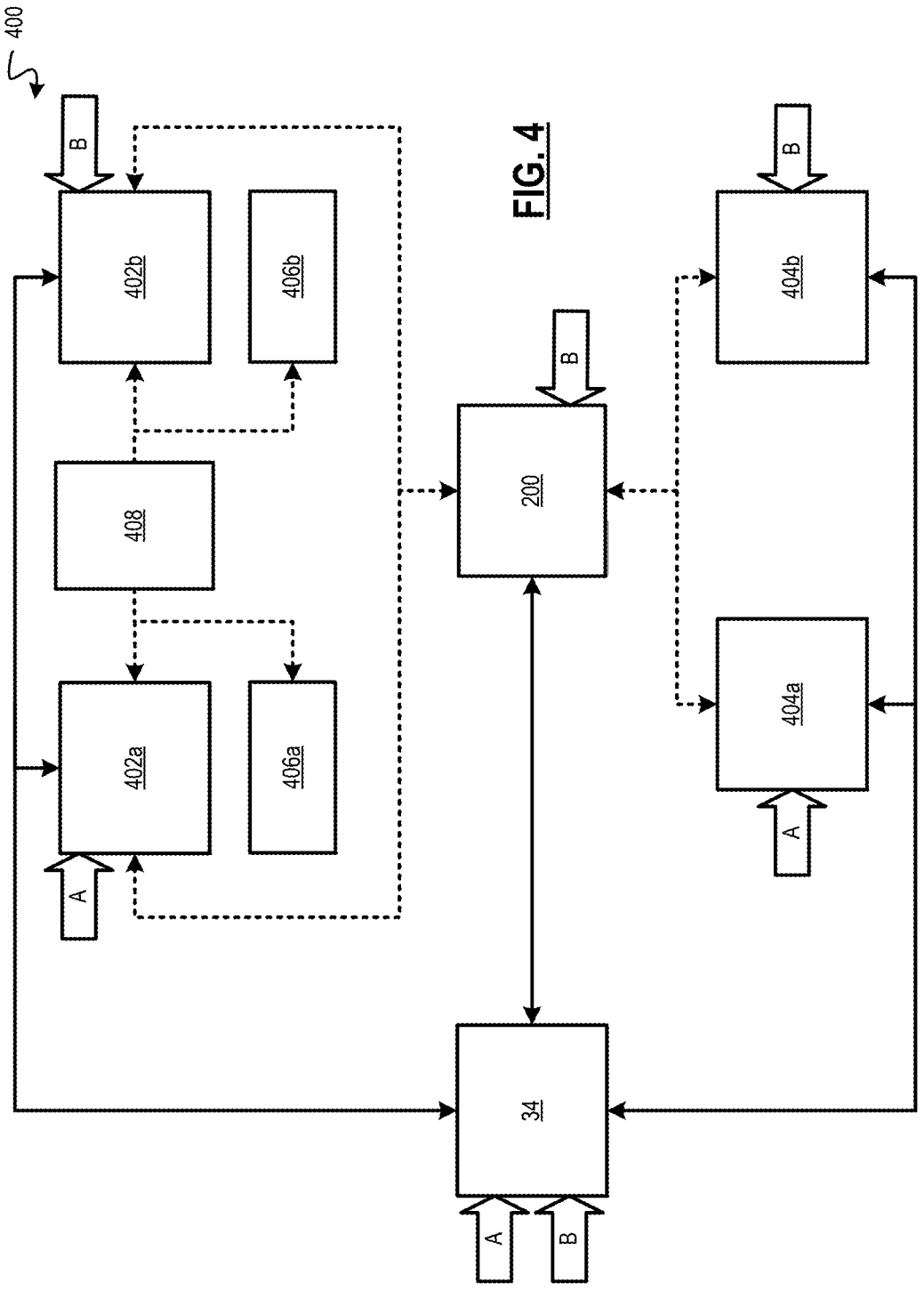
FIG. 4 is a functional block diagram of a system including a redundant safety controller communicatively coupled to a steering by-wire system in accordance with at least one embodiment.

Referring to FIG. 4, a functional block diagram of a system 400 including a redundant safety controller 200 communicatively coupled to a steering by-wire system 204 in accordance with at least one embodiment is shown. The steering by-wire system 204 includes a first hand wheel actuator 402a, a second hand wheel actuator 402b, a first road wheel actuator 404a, a second road wheel actuator 404b, a first steering angle sensor (SAS) 406a, a second SAS 406b and a tertiary SAS 408.

A controller(s) 34 is communicatively coupled to the first hand wheel actuator 402a, the second hand wheel actuator 402b, the first road wheel actuator 404a, the second road wheel actuator 404b via a first communication network. The first communication network, represented by the solid lines, is a first type of communication network. The redundant safety controller 200 is communicatively coupled to the first hand wheel actuator 402a, the second hand wheel actuator 402b, the first road wheel actuator 404a, the second road wheel actuator 404b via a second communication network. The second communication network, represented by the dotted lines, is a second type of communication network. The first type of communication network is different from the second type of communication network. In at least one embodiment, first type of communication network is an Ethernet network. In at least one embodiment, second type of communication network is a controller area network (CAN).

The vehicle 10 includes a first power grid A and a second power grid B. The first power grid A is independent of the second power grid B. In at least one embodiment, the first hand wheel actuator 402a and the first road wheel actuator 404a are configured to be powered by the first power grid A. The second hand wheel actuator 402b and the second road wheel actuator 404b are configured to be powered by the second power grid B. In at least one embodiment, the controller(s) 34 is configured to be powered by the first power grid A and the second power grid B. The redundant safety controller 200 is configured to be powered by one of the first power grid A and the second power grid B. In at least one embodiment, the redundant safety controller 200 is configured to be powered by the second power grid B.

The first SAS 406a is communicatively coupled to the first hand wheel actuator 402a. The first SAS 406a is configured to provide steering wheel angle data to the first hand wheel actuator 402a. The second SAS 406b is communicatively coupled to the second hand wheel actuator 402b. The second SAS 406b is configured to provide steering wheel angle data to the second hand wheel actuator 402b. The tertiary SAS 408 is communicatively coupled to the first hand wheel actuator 402a and the second hand wheel actuator 402b. The tertiary SAS 408 is configured to provide steering wheel angle data to the first hand wheel actuator 402a and the second hand wheel actuator 402b.

The controller(s) 34 is configured to manage operation of the steering by-wire system 204. The redundant safety controller 200 is configured to passively monitor communications between the controller(s) 34 and the steering by-wire system 204. If the redundant safety controller 200 determines that the controller(s) 34 has failed, the redundant safety controller 200 assumes management of the operation of the steering by-wire system 204 and implements the management of the operation of the steering by-wire system 204 based at least in part on the monitored communications between the controller(s) 24 and the steering by-wire system 204. Upon the assumption of the management of the operation of the steering by-wire system 204, the redundant safety controller 200 issues commands to the first hand wheel actuator 402a, the second hand wheel actuator 402b, the first road wheel actuator 404a, and the second road wheel actuator 404b via the second communication network to safely bring the vehicle 10 to a standstill.

In at least one embodiment, redundant safety controller 200 determines that the controller(s) 34 has failed when the controller(s) 34 go silent. In at least one embodiment, redundant safety controller 200 determines that the controller(s) 34 has failed when the controller(s) 34 transmits a failure notification to the redundant safety controller 200. In at least one embodiment, the redundant safety controller 200 is configured to immobilize the vehicle 10 via the steering by-wire system 204, independently determine vehicle standstill, and request electromechanical brake park mechanisms upon determining that the controller(s) 34 has failed. In at least one embodiment, the redundant safety controller 200 is configured to implement reduced feature function of the steering by-wire system 204 upon assumption of control of operational management of the steering by-wire system 204.

Redundancy in the steering function of the steering by-wire system 204 in the vehicle 10 enables the vehicle 10 to maintain functionality in the event of a single failure in the system 400. In the absence of redundancy, a single failure in the system 400 may lead to vehicle immobilization and additional failures may result in a total steering system failure in the vehicle 10. The use of a redundant safety control system 100 enables a mode of steering in the event of a dual-point failure in the system 400. The use of a redundant safety control system 100 prevents loss of vehicle deceleration and allows limited vehicle operation in the presence of single failures in the system 400.

The use of a redundant safety control system 100 may mitigate risk by incorporating orthogonality across the software, the hardware, and the electrical architecture communication in the system 400. Orthogonality in this context ensures that diversity in system components and operational logic minimizes the probability of a single failure affecting multiple system design elements. This strategic diversity enables maintaining steering functionality and system integrity under failure conditions.

The architecture disclosed in system 400 enables a redundant steering method to achieve complete functional independence from a main steering method via diversity of hardware, software and communication between the main and redundant steering control elements. The functional independence of the redundant steering method implemented through the use of the redundant safety control system 100 applies to compute software, hardware (micro, memory, etc.) and communication elements. Failures of one or more of these elements include immunity to external factors that could potentially cause a common cause failure of main and redundant steering functions. The steering by-wire system 204 is able to gain resistance to all single point failures that could induce malfunctioning behavior where both the main and redundant steering cannot provide functionality. This includes protection against cascading failures, common cause failures, and common mode failures.

Figure 5:
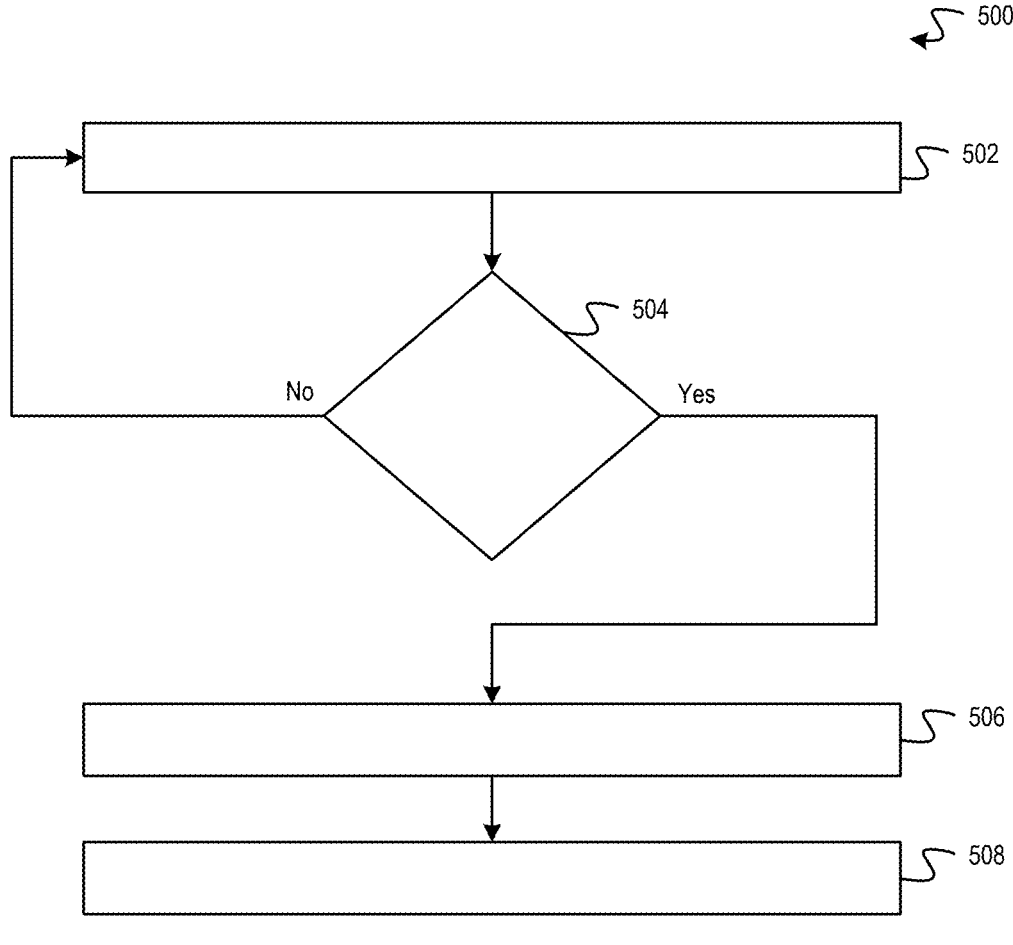
FIG. 5 is a flowchart representation of an exemplary method for implementing redundant safety control in a vehicle in accordance with at least one embodiment.

Referring to FIG. 5, a flowchart representation of an exemplary method 500 for implementing redundant safety control in a vehicle 10 in accordance with at least one embodiment is shown. As can be appreciated in light of the disclosure, the order of operation within the method 500 is not limited to the sequential execution as illustrated in FIG. 5 but may be performed in one or more varying orders as applicable and in accordance with the present disclosure.

At 502, a redundant safety controller 200 monitors communications between a controller(s) 34 and a by-wire control system in the vehicle 10 while the controller(s) 34 is managing operation of the by-wire control system. Examples of the by-wire control system include, but are not limited to, a braking by-wire system 202 and a steering by-wire system 204. At 504, the redundant safety controller 200 determines whether the controller(s) 34 has failed. If the redundant safety controller 200 determines that the controller(s) 34 has not failed, the method 500 returns to 502. If the redundant safety controller 200 determines that the controller(s) 34 has failed, the redundant safety controller 200 assumes management of the operation of the by-wire control system from the controller(s) 34 at 506. At 508, the redundant safety controller 200 issues commands to the by-wire control system to bring the vehicle 10 to a standstill.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A redundant safety control system for a by-wire control system in a vehicle, comprising:

a redundant safety controller configured to:

monitor communications between at least one controller and the by-wire control system, the by-wire control system comprising a braking by-wire system including a front right wheel brake actuator and a rear left wheel brake actuator configured to be powered by a first power grid of the vehicle and a front left wheel brake actuator and a rear right wheel brake actuator configured to be powered by a second power grid of the vehicle, wherein:

the at least one controller has a first hardware architecture and is configured to manage operation of the by-wire control system and be powered by the first and second power grids;

the redundant safety controller has a second hardware architecture and is configured to be powered by one of the first power grid and the second power grid, wherein the first hardware architecture is different from the second hardware architecture;

the at least one controller is configured to implement a first instruction set architecture; and the redundant safety controller is configured to implement a second instruction set architecture, wherein the first instruction set architecture is different from the second instruction set architecture;

determine whether the at least one controller has failed; and assume management of the operation of the by-wire control system based on the determination.

2. The system of claim 1, wherein:

the at least one controller is communicatively coupled to the front right wheel brake actuator, the rear left wheel brake actuator, the front left wheel brake actuator, and the rear right wheel brake actuator via a first communication network; and the redundant safety controller is communicatively coupled to the front right wheel brake actuator, the rear left wheel brake actuator, the front left wheel brake actuator, and the rear right wheel brake actuator via a second communication network, wherein:

the first communication network is a first type of communication network:

the second communication network is a second type of communication network; and the first type of communication network is different from the second type of communication network.

3. The system of claim 2, wherein the first type of communication network is an Ethernet network and the second type of communication network is a controller area network (CAN).

4. The system of claim 1, wherein the braking by-wire system comprises a brake pedal emulator and wherein:

the brake pedal emulator is communicatively coupled to the at least one controller via a first communication channel and configured to transmit brake pedal emulator data via the first communication channel; and the brake pedal emulator is communicatively coupled to the redundant safety controller via a second communication channel and configured to transmit the brake pedal emulator data via the second communication channel.

5. The system of claim 1, wherein the at least one controller is communicatively coupled to the redundant safety controller via a third communication channel and configured to exchange data via the third communication channel.

6. The system of claim 1, wherein:

the by-wire control system further comprises a steering by-wire system comprising:

a first hand wheel actuator and a first road wheel actuator configured to be powered by the first power grid of the vehicle; and a second hand wheel actuator and a second road wheel actuator configured to be powered by the second power grid of the vehicle.

7. The system of claim 6, wherein:

the at least one controller is communicatively coupled to the first hand wheel actuator, the second hand wheel actuator, the first road wheel actuator, and the second road wheel actuator via a third communication network; and the redundant safety controller is communicatively coupled to the first hand wheel actuator, the second hand wheel actuator, the first road wheel actuator, and the second road wheel actuator via a fourth communication network, wherein:

the third communication network is a third type of communication network:

the fourth communication network is a fourth type of communication network; and the third type of communication network is different from the fourth type of communication network.

8. The system of claim 7, wherein the third type of communication network is an Ethernet network and the fourth type of communication network is a controller area network (CAN).

9. The system of claim 6, wherein the steering by-wire system comprises:

a first steering angle sensor (SAS) configured to be communicatively coupled to the first hand wheel actuator;

a second SAS configured to be communicatively coupled to the second hand wheel actuator; and a tertiary SAS configured to be communicatively coupled to the first and second hand wheel actuators.

10. A vehicle including a redundant safety control system comprising:

a by-wire control system, the by-wire control system comprising a steering by-wire system including a first hand wheel actuator and a first road wheel actuator configured to be powered by a first power grid of the vehicle and a second hand wheel actuator and a second road wheel actuator configured to be powered by a second power grid of the vehicle;

at least one controller configured to manage operation of the by-wire control system and be powered by the first and second power grids; and a redundant safety controller configured to:

monitor communications between the at least one controller and the by-wire control system and be powered by one of the first power grid and the second power grid, wherein:

the at least one controller has a first hardware architecture and is configured to manage operation of the by-wire control system;

the redundant safety controller has a second hardware architecture, wherein the first hardware architecture is different from the second hardware architecture;

the at least one controller is configured to implement a first instruction set architecture;

the redundant safety controller is configured to implement a second instruction set architecture, wherein the first instruction set architecture is different from the second instruction set architecture;

determine whether the at least one controller has failed; and assume management of the operation of the by-wire control system based on the determination.

11. The vehicle of claim 10, wherein:

the by-wire control system further comprises a braking by-wire system comprising:

a front right wheel brake actuator and a front left wheel brake actuator configured to be powered by the first power grid of the vehicle; and a rear right wheel brake actuator and a rear left wheel brake actuator configured to be powered by the second power grid of the vehicle.

12. The vehicle of claim 11, wherein:

the at least one controller is communicatively coupled to the front right wheel brake actuator, the rear left wheel brake actuator, the front left wheel brake actuator, and the rear right wheel brake actuator via a first communication network; and the redundant safety controller is communicatively coupled to the front right wheel brake actuator, the rear left wheel brake actuator, the front left wheel brake actuator, and the rear right wheel brake actuator via a second communication network, wherein:

the first communication network is a first type of communication network:

the second communication network is a second type of communication network; and the first type of communication network is different from the second type of communication network.

13. The vehicle of claim 12, wherein the first type of communication network is an Ethernet network and the second type of communication network is a CAN.

14. The system of claim 11, wherein the braking by-wire system comprises a brake pedal emulator and wherein:

the brake pedal emulator is communicatively coupled to the at least one controller via a first communication channel and configured to transmit brake pedal emulator data via the first communication channel; and the brake pedal emulator is communicatively coupled to the redundant safety controller via a second communication channel and configured to transmit the brake pedal emulator data via the second communication channel.

15. The system of claim 10, wherein the at least one controller is communicatively coupled to the redundant safety controller via a third communication channel and configured to exchange data via the third communication channel.

16. The system of claim 10, wherein:

the at least one controller is communicatively coupled to the first hand wheel actuator, the second hand wheel actuator, the first road wheel actuator, and the second road wheel actuator via a third communication network; and the redundant safety controller is communicatively coupled to the first hand wheel actuator, the second hand wheel actuator, the first road wheel actuator, and the second road wheel actuator via a fourth communication network, wherein:

the third communication network is a third type of communication network:

the fourth communication network is a fourth type of communication network; and the third type of communication network is different from the fourth type of communication network.

17. The system of claim 10, wherein the steering by-wire system comprises:

a first steering angle sensor (SAS) configured to be communicatively coupled to the first hand wheel actuator;

a second SAS configured to be communicatively coupled to the second hand wheel actuator; and a tertiary SAS configured to be communicatively coupled to the first and second hand wheel actuators.

18. A method for implementing redundant safety control in a vehicle comprising:

monitoring, by a redundant safety controller, communications between at least one controller and a by-wire control system, the by-wire control system being a braking by-wire system comprising a front right wheel brake actuator and a rear left wheel brake actuator configured to be powered by a first power grid of the vehicle and a front left wheel brake actuator and a rear right wheel brake actuator configured to be powered by a second power grid of the vehicle, wherein:

the at least one controller has a first hardware architecture and is configured to manage operation of the by-wire control system and be powered by the first and second power grids;

the redundant safety controller has a second hardware architecture and is configured to be powered by one of the first power grid and the second power grid, wherein the first hardware architecture is different from the second hardware architecture;

the at least one controller is configured to implement a first instruction set architecture;

the redundant safety controller is configured to implement a second instruction set architecture, wherein the first instruction set architecture is different from the second instruction set architecture;

determining, by the redundant safety controller, whether the at least one controller has failed; and assuming management of the operation of the by-wire control system, by the redundant safety controller, based on the determination.

19. The method of claim 18, wherein:

the at least one controller is communicatively coupled to the front right wheel brake actuator, the rear left wheel brake actuator, the front left wheel brake actuator, and the rear right wheel brake actuator via a first communication network; and the redundant safety controller is communicatively coupled to the front right wheel brake actuator, the rear left wheel brake actuator, the front left wheel brake actuator, and the rear right wheel brake actuator via a second communication network, wherein:

the first communication network is a first type of communication network:

the second communication network is a second type of communication network; and the first type of communication network is different from the second type of communication network.

20. The method of claim 19, wherein the first type of communication network is an Ethernet network and the second type of communication network is a controller area network (CAN).

* * * * *